(12) United States Patent
Hoffmann et al.

(10) Patent No.: US 8,813,989 B2
(45) Date of Patent: Aug. 26, 2014

(54) STEAM PRESSURE VESSEL WITH SAFETY DEVICE

(75) Inventors: Alexander Hoffmann, Wadern (DE); Arnold Thelen, Idar-Oberstein (DE)

(73) Assignee: Fissler GmbH (DE)

( * ) Notice: Subject to any disclaimer, the term of this patent is extended or adjusted under 35 U.S.C. 154(b) by 7 days.

(21) Appl. No.: 13/140,562

(22) PCT Filed: Nov. 21, 2009

(86) PCT No.: PCT/EP2009/008298
§ 371 (c)(1),
(2), (4) Date: Sep. 1, 2011

(87) PCT Pub. No.: WO2010/072291
PCT Pub. Date: Jul. 1, 2010

(65) Prior Publication Data
US 2012/0091146 A1    Apr. 19, 2012

(30) Foreign Application Priority Data
Dec. 23, 2008 (DE) .......................... 10 2008 062 980

(51) Int. Cl.
*A47J 27/09* (2006.01)
*A47J 27/08* (2006.01)
*A47J 27/092* (2006.01)

(52) U.S. Cl.
CPC ............ *A47J 27/092* (2013.01); *A47J 27/0806* (2013.01); *Y10S 220/912* (2013.01)
USPC ................. 220/316; 220/203.05; 220/203.27; 220/315; 220/581; 220/912

(58) Field of Classification Search
CPC ........... A47J 27/08; A47J 27/09; B65B 31/06
USPC ............. 220/203.05, 203.27, 316, 756, 315, 220/581, 912
See application file for complete search history.

(56) References Cited

U.S. PATENT DOCUMENTS

| 4,251,007 A | | 2/1981 | Behnisch |
| 4,541,543 A | * | 9/1985 | Elexpuru ....................... 220/316 |
| 4,620,643 A | * | 11/1986 | Sebillotte ....................... 220/316 |

(Continued)

FOREIGN PATENT DOCUMENTS

DE    27 05 712 A1    8/1978

(Continued)

*Primary Examiner* — Fenn Mathew
*Assistant Examiner* — Elizabeth Volz
(74) *Attorney, Agent, or Firm* — Cantor Colburn LLP (57) ABSTRACT

The invention relates to a steam pressure vessel consisting of a receptacle and a lid, said receptacle and lid each having a long handle and being designed to be tightly joined together by way of overlapping peripheral segments along the lines of a bayonet catch, with the interposition of a sealing ring between the edge of the pot and the edge of the lid, characterized by the combination of at least two closing and opening safety devices, in which case a first safety device comprises a safety valve, the body of which is held in the open position by a spring-biased slide (10) until receptacle and lid are brought into the locked position by turning the two handles (1, 11) so that they lie one on top of the other with the coordinating peripheral segments completely overlapping, and a second safety device raises the sealing ring from the edge of the lid by means of a safety element (safety cam 7) spring-biased in the open position until receptacle and lid are brought into the locked position.

6 Claims, 11 Drawing Sheets

(56) References Cited

U.S. PATENT DOCUMENTS 4,717,041 A * 1/1988 Elexpuru .................. 220/316
5,135,121 A * 8/1992 Javier .................. 220/203.07

FOREIGN PATENT DOCUMENTS

| | | |
|---|---|---|
| DE | 30 27 064 A1 | 2/1982 |
| DE | 295 11 453 U1 | 9/1995 |
| EP | 0 940 107 B1 | 9/1999 |
| EP | 1 295 551 B1 | 3/2003 |
| FR | 2 446 623 A | 8/1980 |
| GB | 1 569 950 A | 6/1980 |
| GB | 2 150 462 A | 7/1985 |
| GB | 2 182 583 A | 5/1987 |

\* cited by examiner

STEAM PRESSURE VESSEL WITH SAFETY DEVICE

The invention relates to a steam pressure vessel consisting of a receptacle (pot, pan or the like) and lid, said receptacle and lid each having a long handle and being designed to be tightly joined together by way of overlapping peripheral segments along the lines of a bayonet catch, with the interposition of a sealing ring between the edge of the pot and the edge of the lid.

According to the standard specifications, pressure cookers must have reliable closing and opening safety systems. These prevent the pressure cooker from being opened whilst there is pressure in the cooking space, and also prevent pressure from building up when the pressure cooker is not properly closed.

With bayonet systems, the segment edge of the cooking vessel or else a handle element with cams, curves etc. oriented towards the segment edge of the cooking vessel occasionally serves as control element for the safety system. A frequent disadvantage with these systems is a possible mechanical manipulation (upon operation of the control element) which, in the event of the lid not being correctly positioned (for example not functionally oriented in respect of the controlling handle element), results in a build-up of pressure when not in the fully closed state. Owing to the necessarily open area of engagement of the safety system (towards the edge of the pot or towards the handle element with control element), during normal operation (e.g. when cleaning the system and in the case of accidental manipulation) the safety chain can be rendered ineffective. Due to the fact that, as a rule, the safety systems only perform their functions when the segments are almost completely overlapping, in the described case, even when the lid is correctly positioned but is for example only half closed, an unsafe pressure could build up. Furthermore with the known safety systems, critical situations can arise from the observation of tolerances, e.g. a pressure build-up is possible with consequent lifting of the lid when the lid is only loosely secured to the pot and the safety system has not yet engaged.

The systems are generally designed in such a way that a continuous functional and safety chain is set up using a number of components. Ideally, these involve a mechanical locking device. However, none of the known systems has an additional device compensating for the above-described cases of manipulation.

DE 27 05 712 B2 discloses a lid-locking and pressure-relief device on a pressure cooker, in which a safety valve is combined with a slide with tongue, in such a way that in the retracted position of the slide the valve body is afforded freedom of movement, in the release position, however, said slide is pressed on to the upper head of the valve body, thus preventing the valve from closing. The movement of the slide is coupled with the functioning of a segment locking device so that it is not possible to open the pressure cooker without the relief of pressure.

DE 30 27 064 C2 discloses a pressure cooker of the above-mentioned type with a pressure-relief device comprising a safety valve with a pin-shaped valve closing body which, when a certain pressure builds up and with an associated velocity of the escaping steam/air mixture, automatically moves from an open position into a closed position due to lifting of the valve body, and automatically opens when a given overpressure is exceeded as a result of further lifting of the valve closing body. The tongue of a manual control element extends over the upper portion of the pin-shaped valve closing body. Whereas in the locked position of the manual control element the tongue is swivelled upwards to the extent that it enables operation of the valve closing body, when the pot is not closed or is not closed properly and the manual control element is operated the tongue presses down on the valve closing body under the action of a locking spring in such a way that steam can be discharged through the safety valve and, if required, the internal pressure of the pot can be completely released. Thus, when the pot is not closed in accordance with the instructions, no hazardous pressure can build up in the pot. Functioning of the safety valve is combined with a handle locking mechanism.

DE 295 11 453 U1 discloses a pressure-relief device on a pressure cooker with a safety valve provided in the wall of the lid, in which case the valve body of the safety valve can move, as a result of steam pressure building up inside the vessel, from a venting position into a closed position against the action of a restoring force. Thus, at the beginning of the cooking process, the oxygen-containing air first escapes from inside the pot prior to the valve closing. The valve body has a pressure-relief aperture and a safety valve body which is pressed against a seal seat surrounding the pressure-relief aperture. This safety valve opens when a given pressure is exceeded. The valve body can be tilted by means of a slide in such a way that steam escapes from inside the vessel. Thus, particularly when the slide is coupled with a lid-locking mechanism, steam can reliably be released until a safe pressure is reached inside the vessel and the lid can then be removed from the pot. The valve body blocks the slide so long as it is in the closed position. Thus the pressure cooker cannot be unlocked until it has been completely depressurized.

It is the objective of the present invention to eliminate the above-described disadvantages of known systems and in particular to provide a pressure vessel which offers even greater improvement in terms of operational safety and preventing undesirable removal of the lid from the receptacle.

This objective is achieved by the combination of two safety devices.

This is particularly accomplished with a pressure vessel of the above-mentioned type thanks to the combination of at least two closing and opening safety devices, in which case a first safety device comprises a safety valve, the body of which is held in the open position by a spring-biased slide until receptacle and lid are brought into the locked position by turning the two long handles one on top of the other so that the coordinating peripheral segments completely over-lap, and a second safety device raises the sealing ring from the edge of the lid by means of a safety cam which is spring-biased in the open position until receptacle and lid are brought into the locked position by turning the two handles so that they lie one on top of the other with the coordinating peripheral segments completely overlapping, and only as a result of turning the two handles one on top of the other into their locked position is the slide moved away or movable from the valve body and the safety cam moved away or movable from the sealing ring so that the valve body and sealing ring each move into their closed or sealing positions.

The two safety devices are normally controlled, simultaneously activated as well as deactivated by an actuating member (actuating bolt) provided on the pot handle. The second safety device safeguards the first safety device against manipulation and at the same time forms a component of the dual safety system.

In a particular embodiment of the invention, the slide is only moved or movable into its advanced position relative to the valve body for holding this in the open position and thus the handles can only be turned relative to one another in direction of opening once the interior of the vessel has become depressurized.

In another particular embodiment, it is proposed that, when the handles are turned one on top of the other into the closed position, a closing bolt is actuated by means of an actuating bolt provided on the pot handle and thus the slide is moved away from the safety valve so that its valve body can close and at the same time, via the combination of actuating bolt and driving shaft, the slide, under the action of a spring (tension spring) and thanks to an appropriate shape of the slide, moves into a locking position so that when the valve body is closed, the handles are blocked from being turned in direction of opening.

Furthermore, for improved operation, it is proposed that when the handles are turned one over the other, the safety cam is moved out of contact with the sealing ring by a driving shaft under the action of at least one spring (spiral spring) so that said sealing ring can rest against the edge of the lid.

Furthermore, for practical operation, a push-button can be slidably mounted in the handle of the lid, and when the push-button is pressed in, the safety valve can be moved into an open position for the purpose of relieving the pressure and the slide can then be moved into an unlocked position.

Further aims, features, advantages and possible applications will be made apparent in the following description of a working example, with reference being made to the attached drawing. All the described and/or illustrated features, alone or in any combination, then form the subject-matter of the invention, and this irrespective of their inclusion in individual claims or in claims referring back to preceding claims.

The dual closing and opening safety device according to the invention works with a lid handle 1 and pot handle 11 having a control element taking the form of, for example, an actuating bolt 8. When the lid has not been properly placed on the pot, two safety systems ensure that no pressure builds up in the pressure vessel. Upon actuation of a first safety device, a second safety device, which can only be actuated from inside the pot, is still functional.

Figure 1:
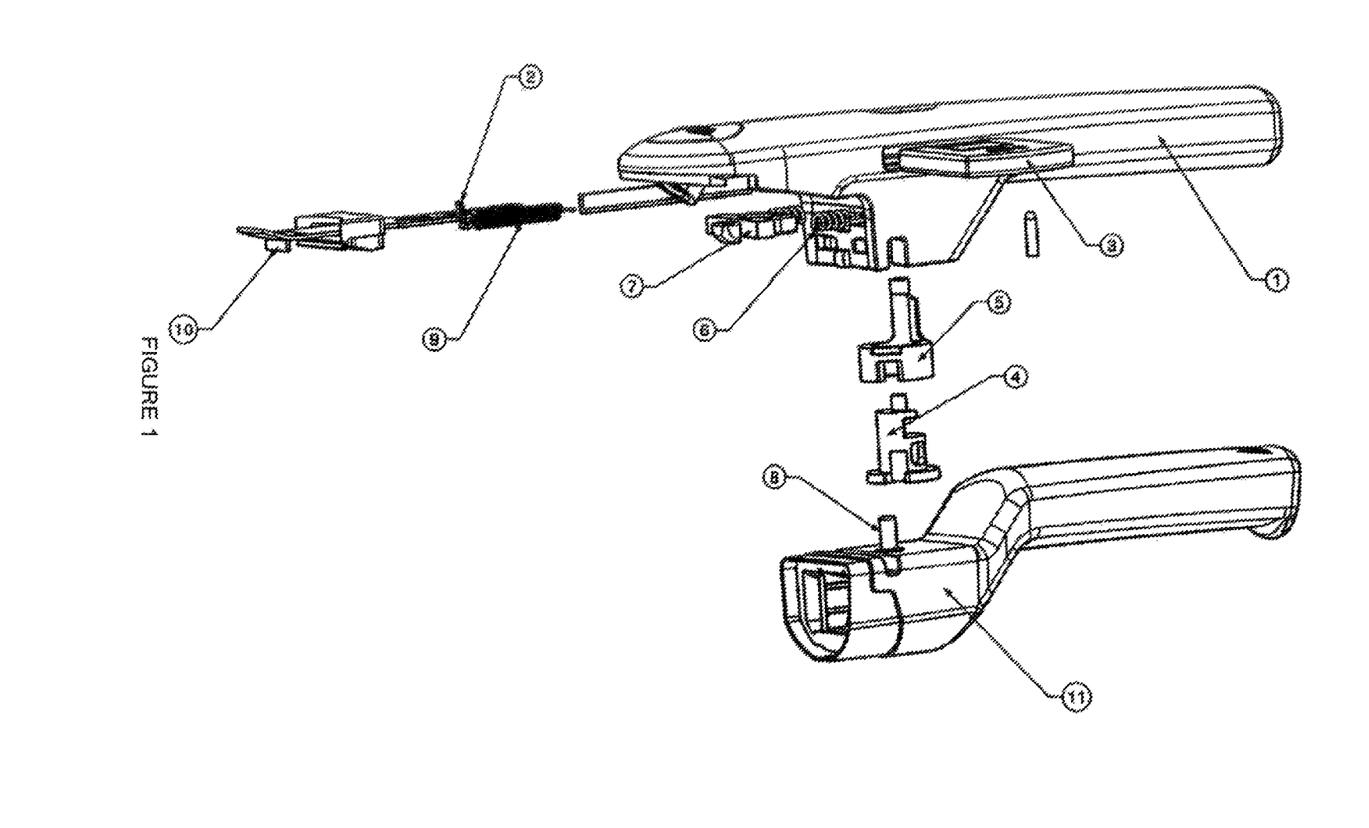
FIG. 1 shows, in an exploded view, the individual components of a safety device in a particular embodiment of a pressure vessel according to the invention.
Figure 2:
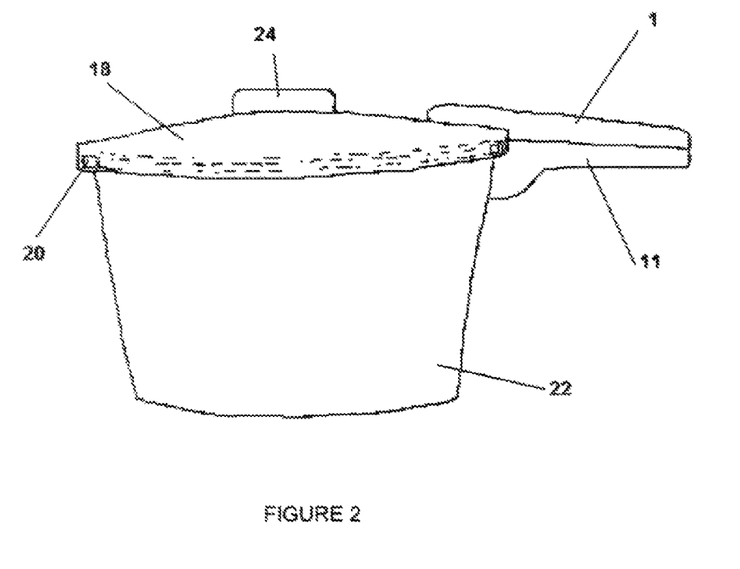
FIG. 2 is a side elevational view of the safety device of FIG. 1 with the pressure vessel.

In particular, the first safety device comprises a closing bolt 5, a tension spring 9, and a spring-biased slide 10. The first safety device further comprises a safety valve 24 as shown in FIG. 2. When the closing bolt 5 is triggered and actuated by the actuating bolt 8 on the pot handle 11 upon the handles 1, 11 being turned one over the other in the closing direction, the slide 10 moves away from the safety valve 24. FIG. 2 schematically depicts an exemplary embodiment of a steam pressure vessel including a receptacle that is a pot 22. The vessel further includes a lid 18, a safety valve 24, and a sealing ring 20. The safety valve 24 previously held in the pressure-relief position (open position) (so as to prevent pressure from building) can now close and a pressure can build up inside the pot 22. At the same time, via the combination of the closing bolt 5, the tension spring 9 and the slide 10 (in the form of a plate for example), opening of the pressure vessel is blocked by an appropriately curved shape of the slide 10, and a push-button 3, slidably mounted in the lid handle 1, is pushed outwards. The pressure vessel can only be opened again when the valve body of the safety valve 24 has dropped again enabling the slide 10 to be actuated.

The second safety device specifically comprises a driving shall 4 and a safety cam 7 acted on by at least one spring element in the form of a spiral spring 6. When the driving shaft 4 is triggered and actuated by the actuating bolt 8 in the pot handle 11 upon turning of the handles 1, 11 one over the other into the locking position, the safety cam 7 moves back. Until then, the safety cam 7 was pressing the sealing ring 20 (shown in FIG. 2), which is permanently under spring bias, away from the edge of the lid. It was impossible for pressure to build up before retraction of the safety cam 7.

If, after use, the pressure vessel has to be opened whilst it is still hot, the user presses the push-button 3 inwards with the result that the body of the safety valve moves into the pressure-relief position. Only when the pressure has been completely discharged can the push-button 3 be fully pushed into the handle 1 of the lid. The push-button 3 acts via a curved path on, a driver 2 on the slide 10 in the lid handle 1 in such a way as to push said slide 10 forwards and thus bring the safety valve into the pressure-relief position. When the safety valve has "dropped", the push-button 3 can be completely pushed through. Via the curve control in the slide 10, the closing bolt 5 is turned over the last mm so that the system as a whole opens and the lid can be opened again.

When the push-button 3 is operated, then this, via the driver 2 on the slide 10, moves the slide forwards to relieve the pressure in the system. When the pressure inside the vessel is less than 0.04 bar, the safety valve (not shown) drops into its initial position.

Then the push-button 3 can be pushed further in and, via the driver 2 on the slide 10, moves said slide further forward. At the same time, the spiral springs 6 and safety cam 7 apply a torque to the guide grooves of the driving shaft 4 and to the closing bolt 5 via the appropriately configured geometry of the driving shaft 4.

When the slide 10 has moved into the end position as a result of the push-button having been operated in the way described above, then in this end position the accumulated torque comes into effect and turns the pot and lid relative to one another, thus automatically deactivating the system.

Figure 3:
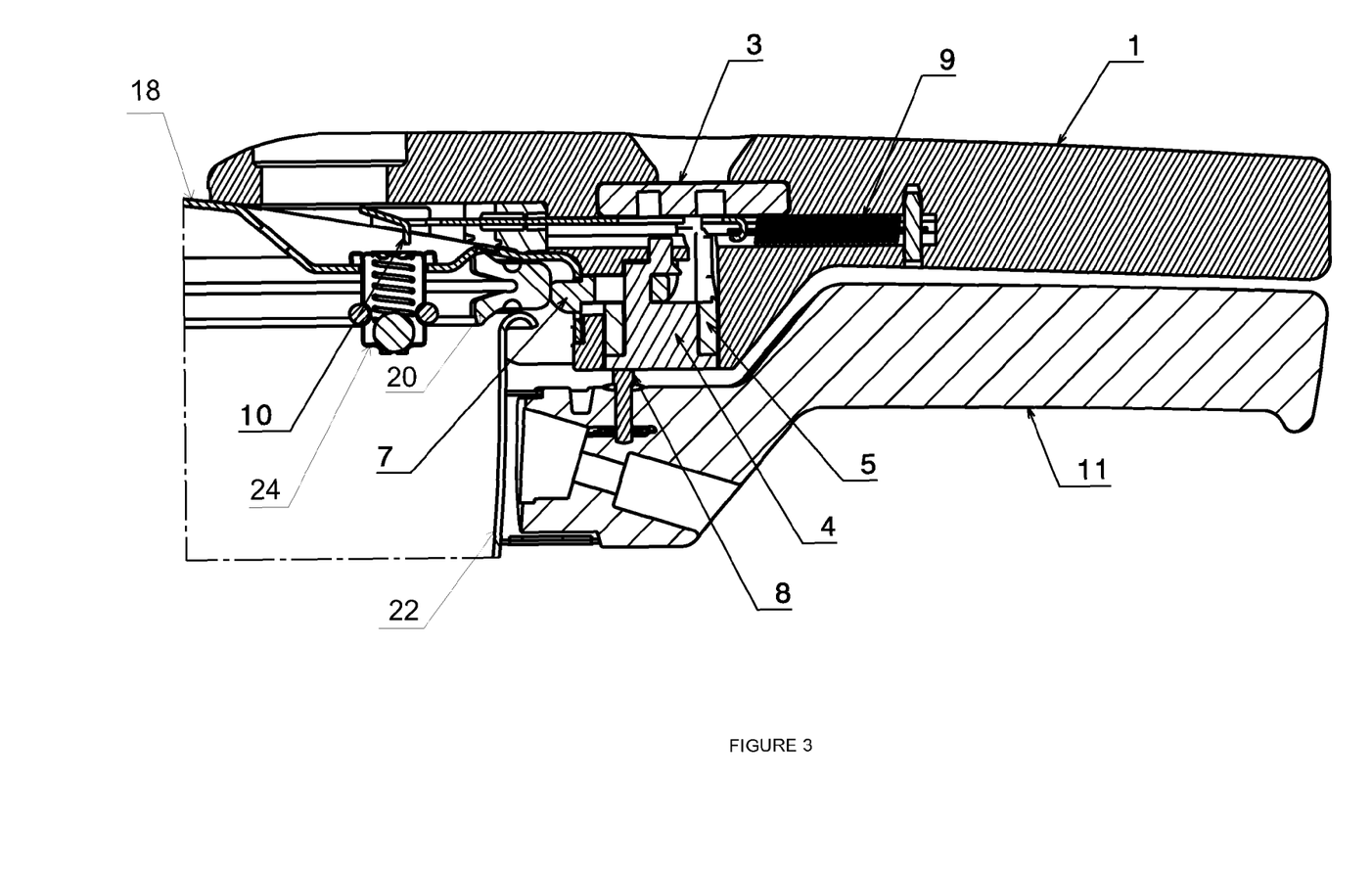
FIG. 3 is a sectional side view of the safety device of FIGS. 1-2 in an open position.
Figure 4:
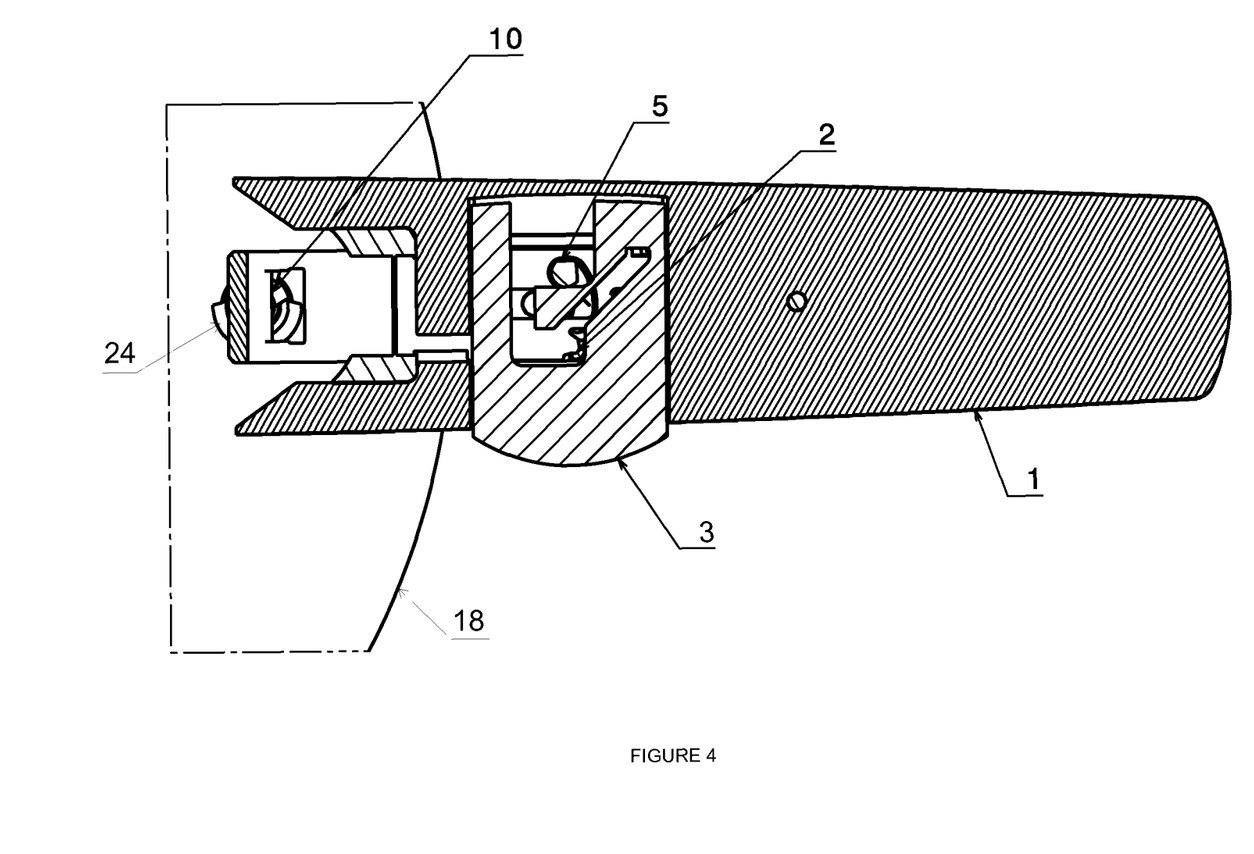
FIG. 4 is a top elevational view of FIG. 3.
Figure 5:
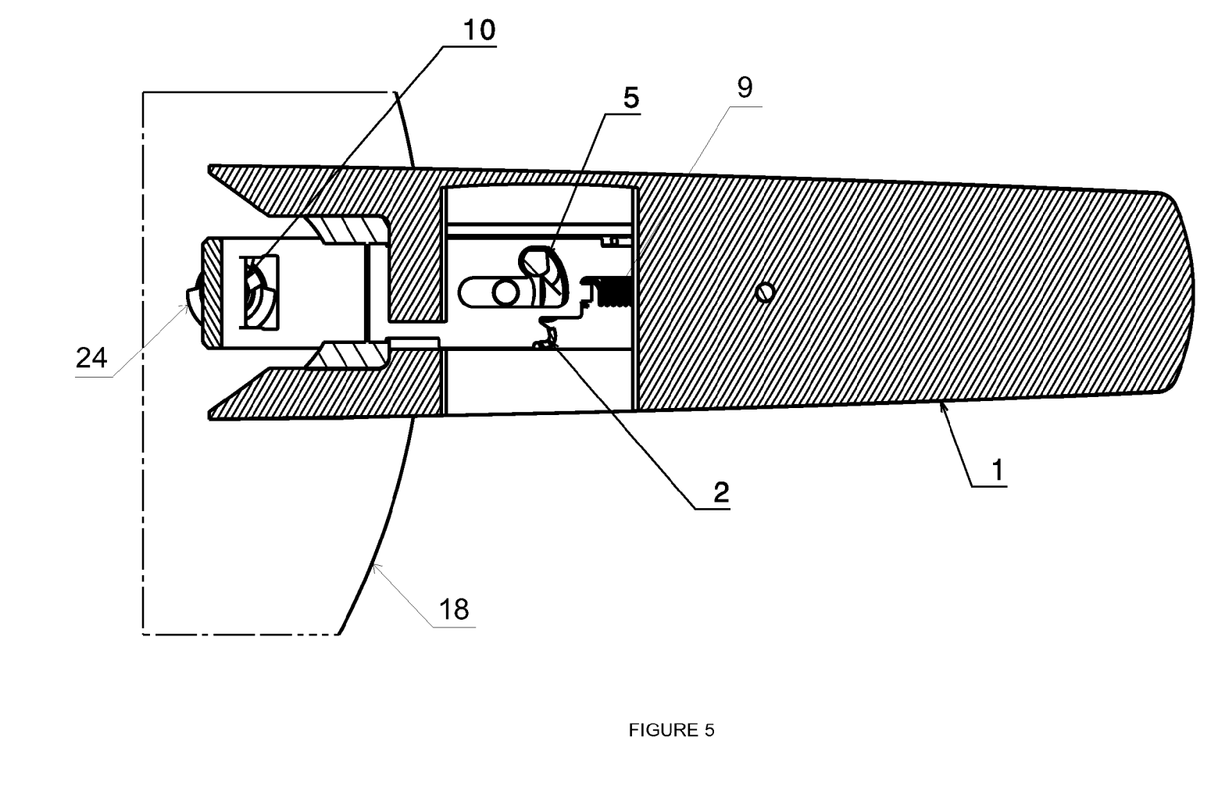
FIG. 5 is a top elevational view of FIG. 4 without the pushbutton.

As seen in FIGS. 3-5, handles 1, 11, lid 18, and receptacle 22 are in an open position. While lid 18 is initially positioned on receptacle 22, handles 1, 11 are not aligned because actuating bolt 8 has not actuated driving shaft 4 and closing bolt 5. As illustrated in FIGS. 3-5, slide 10 blocks safety valve 24 in its open position. As such, pressure cannot build up within the vessel. Slide 10 holds down safety valve 24 and safety cam 7 pushes sealing ring 20 away from lid 18.

Figure 6:
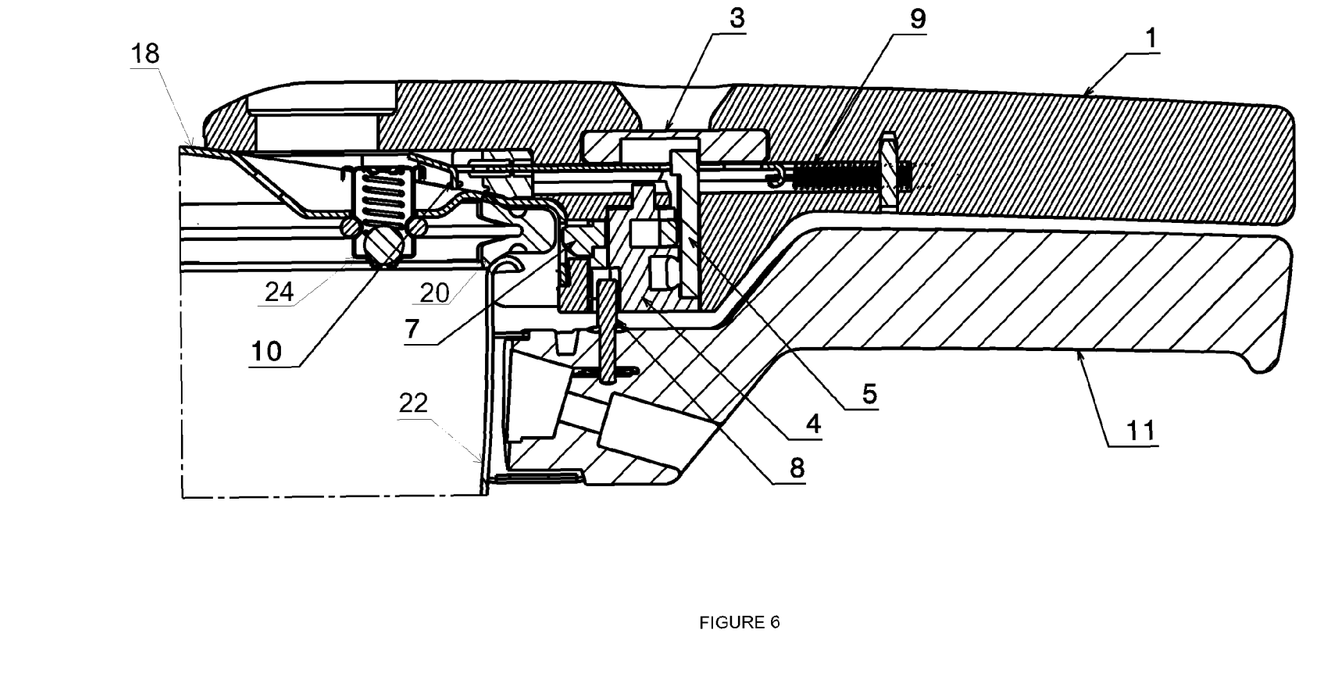
FIG. 6 is a sectional side view of the safety device of FIGS. 1-5 in a closed position and under pressure.
Figure 7:
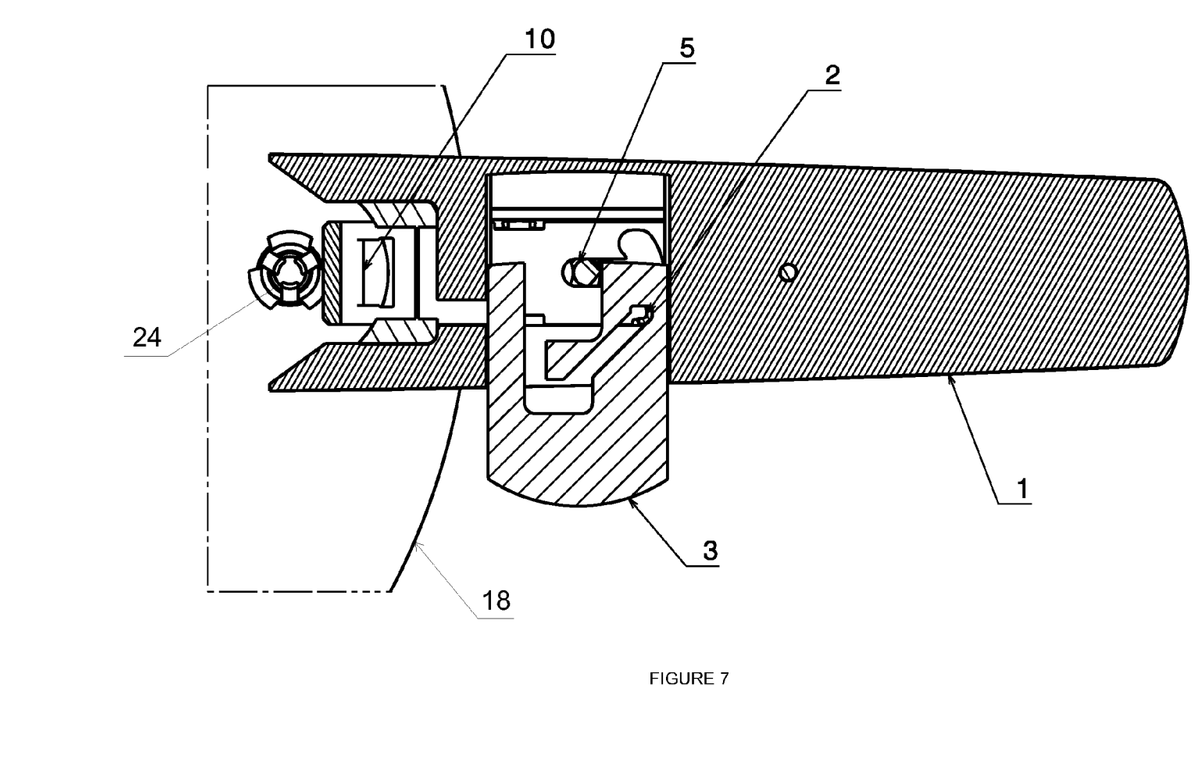
FIG. 7 is a top elevational view of FIG. 6.
Figure 8:
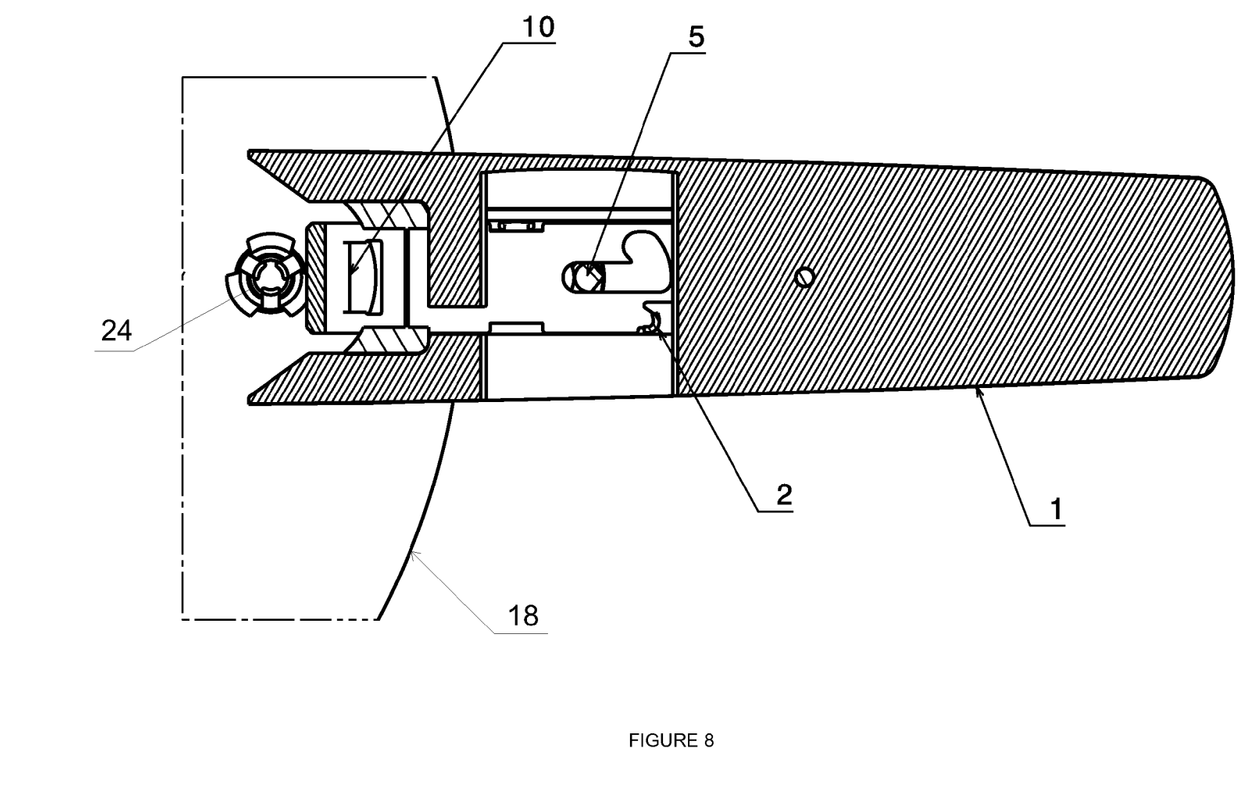
FIG. 8 is a top elevational view of FIG. 7 without the pushbutton.

Turning to FIGS. 6-8, handles 1, 11 and lid 18 are in a closed position when the vessel is under pressure. Spring 9 and safety cam 7 are both disposed towards the right, with respect to that shown in FIG. 3. With this configuration slide 10 moves towards the spring 9 and does not block safety valve 24, and sealing ring 20 provides a tight seal between lid 18 and receptacle 22. Safety valve 24 can close by moving upwardly so that pressure is able to build within the vessel.

Figure 9:
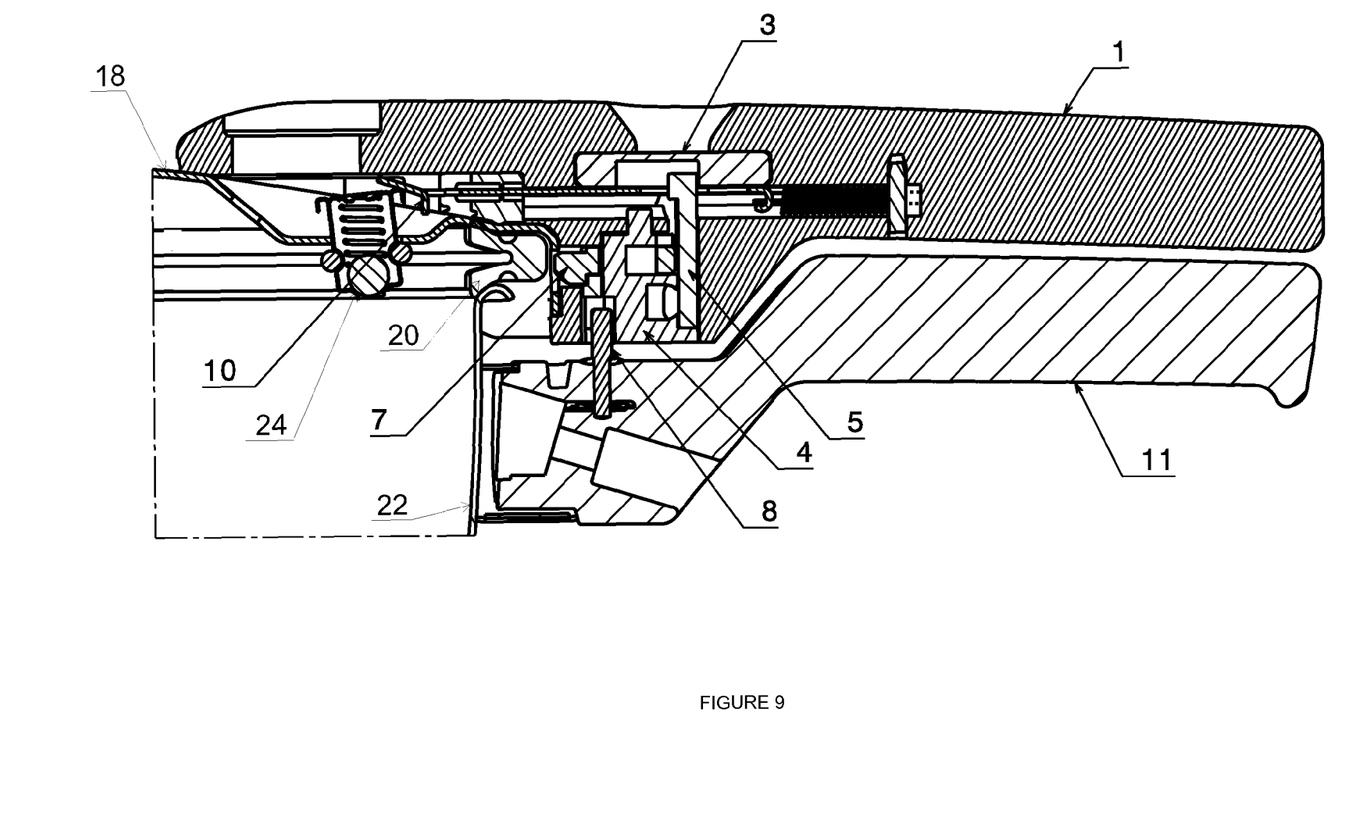
FIG. 9 is a sectional side view of the safety device of FIGS. 1-8 in a closed position with pressure relief.
Figure 10:
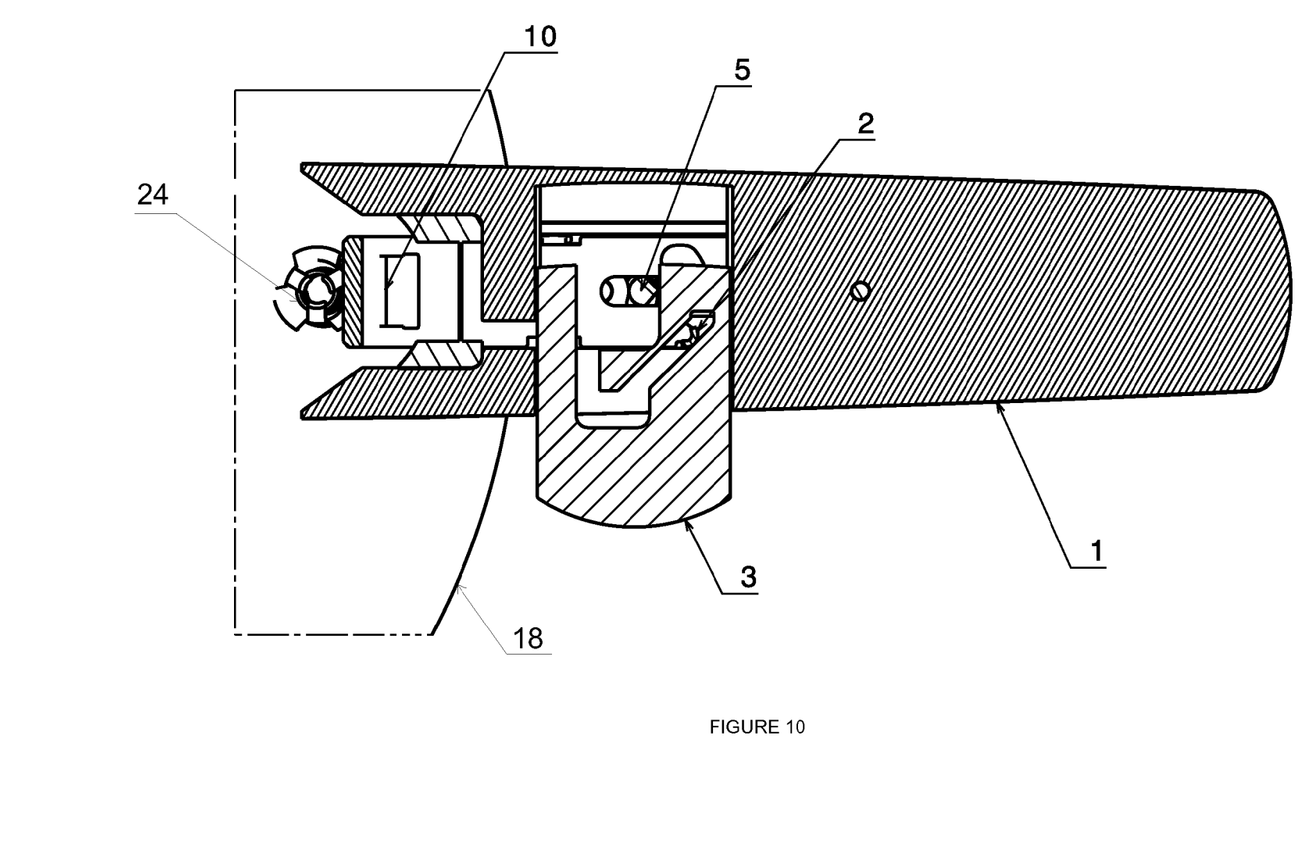
FIG. 10 is a top elevational view of FIG. 9.
Figure 11:
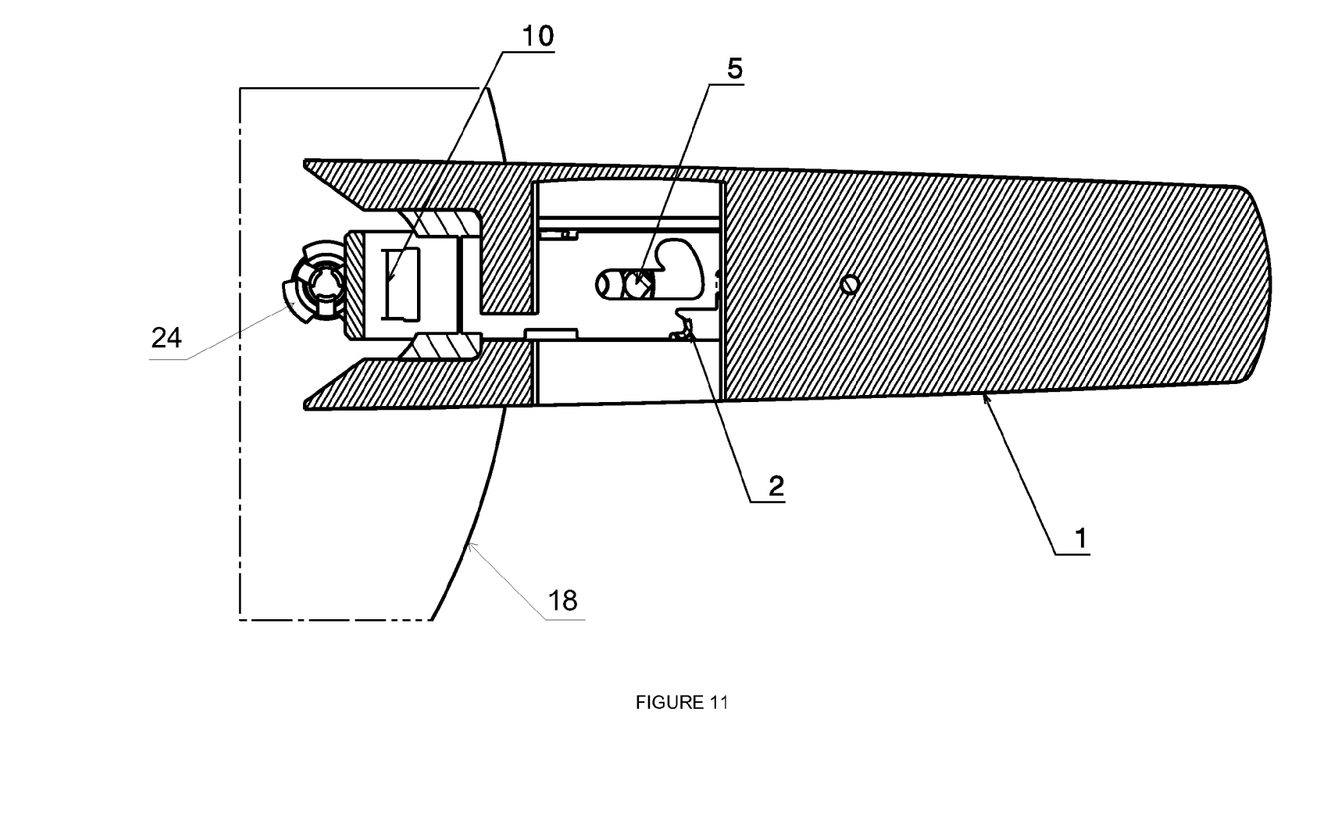
FIG. 11 is a top elevational view of FIG. 10 without the pushbutton.

FIGS. 9-11 illustrate handles 1, 11 oriented in a closed position wherein pressure relief has started. As such, slide 10 is disposed towards the safety valve 24 by pushing push-button 3 into handle 1. Slide 10 engages safety valve 24 and prevents the same from moving downwardly. However, part of slide 10 enables safety valve 24 into its pressure relief position in which safety valve 24 is tilted. When pressure completely discharges, safety valve 24 moves downwardly such that push-button 3 can be fully pushed into handle 1 and slide 10 can move to the left. This returns the handles 1, 11, lid 18, and receptacle 22 to an open position.

LIST OF REFERENCE NUMERALS

1 Lid handle (long handle)
2 Driver on the slide
3 Push-button
4 Driving shaft
5 Closing bolt
6 Spring element (spiral spring)
7 Safety element (safety cam)
8 Actuating bolt
9 Tension spring
10 Slide (slide plate)
11 Pot handle (long handle)
18 Lid
22 Pot
24 Safety valve

The invention claimed is:

1. A steam pressure vessel comprising:
   a receptacle and a lid, each of the receptacle and the lid having a long handle and designed to be tightly joined together by way of overlapping peripheral segments as in a bayonet catch, with interposition of a sealing ring between an edge of the receptacle and an edge of the lid; and
   at least first and second closing and opening safety devices, wherein the first safety device comprises a safety valve, a valve body of the safety valve being held in an open position by a spring-biased slide until the receptacle and the lid are brought into a locked position by turning the handle of the receptacle and the handle of the lid so that they lie one on top of the other with complete overlapping of the peripheral segments,
   wherein the second safety device raises the sealing ring from the edge of the lid via a safety element, spring-biased in an open position, until the receptacle and the lid are brought into the locked position by turning the handle of the receptacle and the handle of the lid so that they lie one on top of the other with the peripheral segments completely overlapping, and
   wherein only by turning the handle of the receptacle and the handle of the lid one over the other into the locked position is the slide moved away or movable from the valve body and the safety element moved away or movable from the sealing ring so that each of the valve body and the sealing ring moves into a closed or sealing position.

2. A steam pressure vessel according to claim 1, wherein the slide is only moved or movable into an advanced position relative to the valve body for holding the body in the open position, and
   wherein the handle of the receptacle and the handle of the lid can thereby only be turned relative to each other in a direction of opening once an interior of the vessel has become depressurized.

3. A steam pressure vessel according to claim 1, wherein, when the handle of the receptacle and the handle of the lid are turned to lie one on top of the other in a closed position, a closing element is actuated by an actuating bolt provided on the handle of the receptacle, and
   wherein the slide is thereby moved away from the safety valve so that the valve body can close, and at the same time, via the actuating bolt and the closing element, the slide is configured to move under an action of a spring, into a locked position such that when the valve body is closed, turning of the handle of the receptacle and the handle of the lid in a direction of opening is blocked.

4. A steam pressure vessel according to claim 1, wherein, when the handle of the receptacle and the handle of the lid are turned to lie one on top of the other, the safety element is moved by a driving shaft under an action of a spring so as to disengage from the sealing ring so that the sealing ring can rest against the edge of the lid.

5. A steam pressure vessel according to claim 1, wherein both of the first safety device and the second safety device are triggered, activated and deactivated by an actuating bolt provided in the handle of the receptacle.

6. A steam pressure vessel according to claim 1, further comprising a push-button slidably mounted in the handle of the lid, and
   wherein, when the push-button is pressed in, the safety valve can be moved into an open position for relieving pressure and the slide can then be moved into an unlocked position.

* * * * *